(12) United States Patent
Upton et al.

(10) Patent No.: US 6,317,257 B1
(45) Date of Patent: Nov. 13, 2001

(54) TECHNIQUE FOR POLARIZATION LOCKING OPTICAL OUTPUTS

(75) Inventors: Eric Lawrence Upton, Redondo Beach; Michael Gordon Wickham, Rancho Palos Verdes, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/552,813

(22) Filed: Apr. 20, 2000

(51) Int. Cl.$^7$ .................................................. H01S 3/00
(52) U.S. Cl. ..................... 359/349; 359/346; 359/341.4
(58) Field of Search ................... 359/349, 341, 359/341.4, 346

(56) References Cited

U.S. PATENT DOCUMENTS

| | | | |
|---|---|---|---|
| 5,212,743 | 5/1993 | Heismann | 385/11 |
| 5,717,516 | * 2/1998 | Klein et al. | 359/334 |
| 5,946,130 | * 8/1999 | Rice | 359/349 |
| 6,061,170 | * 5/2000 | Rice et al. | 359/341 |

OTHER PUBLICATIONS

F. Heismann, et al., "Integrated–optic polarization controller with unlimited transformation range", *Applied Physics Letters* 57(9), Aug. 27, 1990, pp 855–857.

* cited by examiner

*Primary Examiner*—Mark Hellner
(74) *Attorney, Agent, or Firm*—Antonelli, Terry, Stout & Kraus, LLP (57) ABSTRACT

A technique for polarization locking optical outputs of N optical amplifiers to a reference polarization output, N being an integer, includes providing N optical loops and a reference optical loop. Each of the N optical loops includes a polarization controller connected to an optical amplifier. The reference optical loop includes a reference polarization controller and a linear optical polarizer. An optical output from a laser source is fed to all of the polarization controllers. A portion of an optical output of the reference polarization controller is fed back to an input of the reference polarization controller via the linear polarizer. A portion of the optical output of the reference polarization controller is fed to an optical input of each of N beam splitters and an optical output of each amplifier of the N loops is fed to an optical input of a respective one of the N beam splitters. A substantial portion of the optical output of each amplifier is output by its respective beam splitter. An interference optical output of the two optical inputs fed into each of the N beam splitters is fed back to a respective one of the polarization controllers of the N loops such that the N optical loops are polarization locked with the reference optical loop.

46 Claims, 3 Drawing Sheets

TECHNIQUE FOR POLARIZATION LOCKING OPTICAL OUTPUTS

BACKGROUND OF THE INVENTION

1. Field of the Invention

The present invention relates to a technique for polarization locking optical outputs. More particularly, the present invention relates to a technique for polarization locking the optical outputs of a plurality of optical amplifiers receiving an optical input signal from a common laser source.

2. Description of the Related Art

The architecture for high power phase array fiber lasers or fiber amplifiers/lasers require that the elements of the array have a common polarization. In the past, to achieve this common polarization, it was necessary to use polarization maintaining optical amplifiers or lasers in the array or to use a double pass Faraday mirror configuration to correct for the depolarization occurring in the fiber amplifiers.

In the former case, practical high power polarization maintaining optical amplifier fibers do not exist.

In the Faraday mirror case, the amplifier has to be double passed and the Faraday mirrors have to survive the high optical power input thereto. Furthermore, the architecture is complicated and requires many components.

SUMMARY OF THE INVENTION

The present invention removes the need for either measure noted above and instead corrects for any depolarization that may occur in the fiber amplifiers/lasers with an inline polarization controller for each element in the array. Each element's polarization is locked to a reference laser's polarization.

The above noted object of the present invention may be achieved in an optical polarization locked loop apparatus comprising: a laser source having an optical output; N polarization controllers respectively optically connected to N optical amplifiers, N being an integer, each of the N polarization controllers having an optical input connected to the optical output of the laser source; a reference polarization controller having an optical input connected to the optical output of the laser source and having an optical output fed back to an input thereof via a linear polarizer; N beam splitters, each beam splitter having two optical inputs and one optical output, one of the inputs being connected to an optical output of a respective one of the N optical amplifiers and another of the inputs being connected to the optical output of the reference polarization controller and an output being fed back to an input of a respective one of the polarization controllers; wherein each of the N optical amplifiers outputs is polarization locked to the optical output of the reference polarization controller.

The above noted object may also be effected by providing a method of polarization locking N optical loops to a reference loop, N being a positive integer, each of the N optical loops including a polarization controller connected to an optical amplifier, and the reference optical loop including a reference polarization controller and a linear optical polarizer, the method comprising the steps of: providing an optical output from a laser source to all of the polarization controllers; feeding back a portion of an optical output of the reference polarization controller to the reference polarization controller via the linear polarizer; feeding a portion of the optical output of the reference polarization controller to an optical input of each of N beam splitters and feeding an optical output of each amplifier of the N loops to a respective one of the N beam splitters, a substantial portion of the optical output of each amplifier being output by its respective beam splitter, wherein an interference optical output of the two optical inputs fed to each of the N beam splitters is fed back to a respective one of the polarization controllers of the N loops such that the N optical loops are polarization locked with the reference optical loop.

DESCRIPTION OF THE PREFERRED EMBODIMENT

Figure 1:
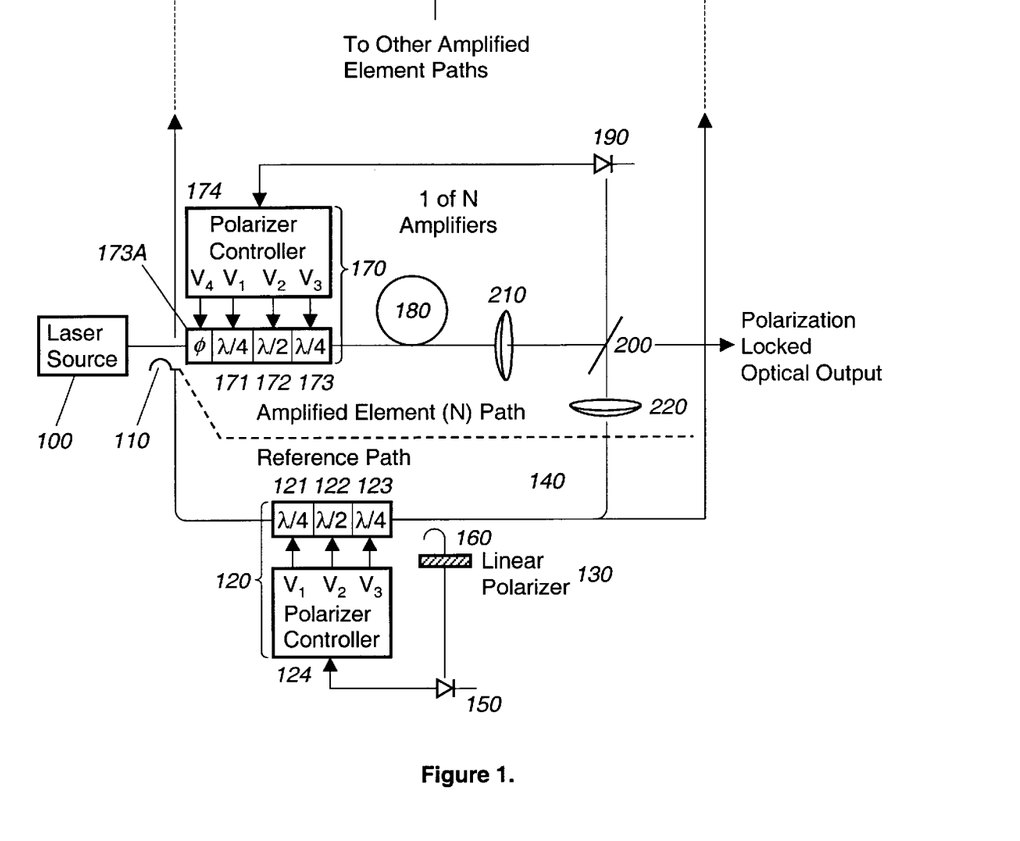
FIG. 1 illustrates an optical polarization locked apparatus in accordance with the present invention.

FIG. 1 illustrates an optical polarization locked apparatus in accordance with the present invention. FIG. 1 is only a partial diagram in that a single amplified element path is illustrated. Normally, there will be N amplified element paths where N is a positive integer.

A laser source 100, which often has an uncontrolled state of polarization, is split into N+1 paths, namely, a reference path and N amplified paths. As noted above, only one of the amplified element paths is illustrated for simplicity.

A coupler 110 of the reference path taps off a portion of the optical output of the laser source 100. The output of the coupler 110 is fed to a polarization controller 120.

The polarization controller 120 consists of three electrically controllable elements including a quarter wave element 121, a half wave element 122 and another quarter wave element 123 arranged serially in an optical path. These three fractional wave elements, which may be rotatable, each vary the orientation of linear birefringence along their optical wavelength and introduce a specified phase retardation.

The three fractional wave elements 121–123 respectively receive control voltages $V_1$, $V_2$, and $V_3$, generated by a polarizer controller 124.

An output of the quarter wave element 123 is fed to a polarization maintaining fiber 140 which is connected to an amplified element path.

In actuality, the output of element 123 is split so as to be connected to N polarization maintaining fibers, each fiber being respectively connected to one of the N amplified element paths.

Another coupler 160 taps off a portion of the optical output of the quarter wave element 123 and feeds it to a linear polarizer 130.

The optical output of the linear polarizer 130 impinges upon a photodetector 150, such as a photodiode, where it is converted into an electrical signal fed back to the polarizer controller 124.

The operation of the polarization controller 120 will be discussed in detail below. Suffice to say that the polarization controller performs a hypothesis search so as to adjust the polarization of the three fractional wave elements 121–123 such that the optical output of the quarter wave element 123 fed to the polarization maintaining fibers 140 is either at a fixed polarization or, as will be discussed later, at a modulated polarization around a fixed center value.

The same laser source 100 also feeds each of the polarization controllers 170 of each amplified element path.

Each polarization controller 170 comprises a quarter wave element 171, a half wave element 172, and another quarter wave element 173 arranged serially in an optical path as with the polarization controller 120.

As with the polarization controller 120, a polarizer controller 174 also provides three voltage outputs $V_1$, $V_2$, and $V_3$, which respectively control the fractional wave elements 171–173.

Furthermore, another phase adjuster 173A may be provided in the optical path serially with the elements 171–173. A voltage $V_4$, outputted by the controller 174 controls the phase adjuster 173A. The purpose of the optional phase adjuster will be explained later.

The optical output of the quarter wave element 173 is fed to an optical amplifier 180. The optical amplifier 180 produces a high power optical signal whose polarization must be controlled, along with all of the optical amplifiers of the other N-1 paths, so as to have the same polarization as that output from the reference path, that is—the output of the quarter wave element 123.

The output of the amplifier 180 is fed through an optical lens 210 to a beam splitter 200.

An output from one of the polarization maintaining fibers 140 is also fed through an optical lens 220 to another input of the beam splitter 200.

The optical outputs of the amplifier 180 and the respective polarization maintaining fiber 140 form an interference output which is fed to a photodetector 190, which may be a photodiode, where the interference output is converted into an electrical signal fed back to the polarizer controller 174.

Most of the optical output of the amplifier 180 passes through the beam splitter 200 untouched.

The polarization controller 170, together with the amplifier 180 and beam splitter 200 and photodetector 190 form a feedback path arranged such that the polarization of each of the N amplifiers 180 is locked to the polarization of the output signal from the referenced path.

Thus, by utilizing N amplified element paths, a coherent wave front may be obtained such that if the N amplifiers are arranged in a matrix having their outputs, that is—their respective beam splitter outputs, arranged in a plane, then they radiate light out as a plane wave so that at a distance, they appear to be one larger laser with a common wave front.

Furthermore, as will be discussed in detail below, one or more of the polarization controllers 170 may also have modulation signals applied thereto so as to locally modulate the polarization so as to produce an optical output which is perturbed around the polarization locked value of the reference path.

This enables one to produce a wavefront out of the matrix of optical amplifiers which would result in a two dimensional phase plane rather than a coplaner output if no modulation was applied.

It is also possible to globally modulate the reference polarization controller so as to thereby modulate the entire wavefront output from the N beam splitters since all of the N polarization controllers are polarization locked to the reference polarization controller.

It is also possible to both globally modulate the reference polarization controller and to locally modulate one or more of the N polarization controllers simultaneously.

Figure 2:
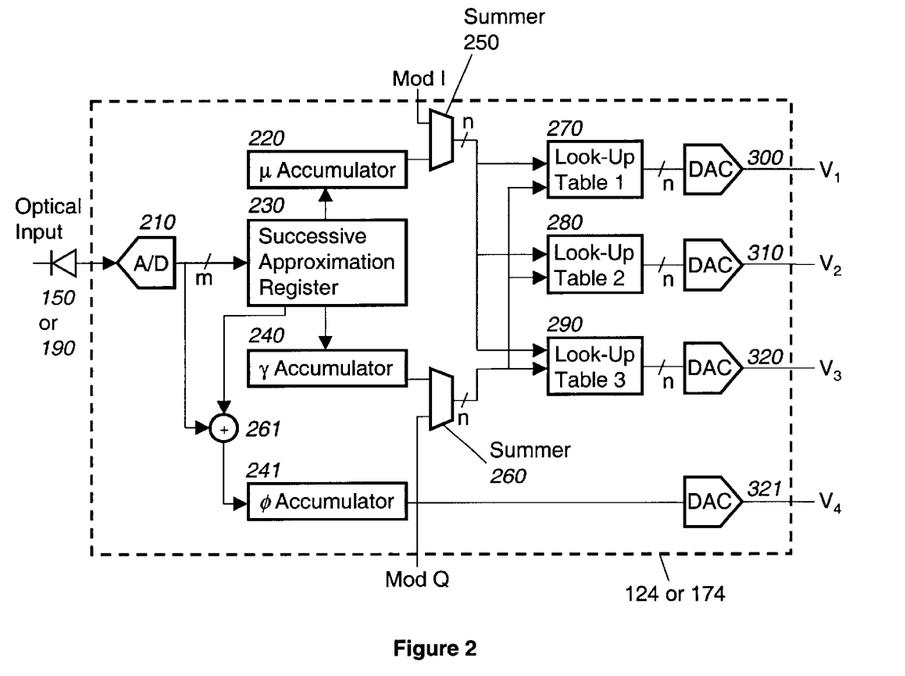
FIG. 2 illustrates an optical polarizer controller.

FIG. 2 illustrates the optical polarizer controllers 174 and 124 of FIG. 1.

In operation, an optical input impinging upon photodetectors 150 or 190 (which may be photodiodes, for example) produces an electrical output which is fed to an analog to digital converter (A/D) 210.

The m parallel outputs of the analog to digital converter 210 are fed to a successive approximation register 230 whose outputs are fed to $\mu$ and $\gamma$ accumulators 220 and 240.

The n outputs of the $\mu$ and $\gamma$ accumulators 220 and 240 are fed to optional summers 250 and 260, respectively.

Note that these summers are utilized only in the case of polarization modulating the output of the controller either globally or locally.

If the output of the optical polarization controller 124 or 174 is to be modulated, modulation inputs mod I and mod Q are respectively input into the summers 250 and 260 so as to be added to the respective outputs of the $\mu$ and $\gamma$ accumulators 220 and 240.

The N outputs of the $\mu$ and $\gamma$ accumulators 220 and 240 are each input to lookup table 1, lookup table 2, and lookup table 3, which are respectively elements 270, 280 and 290.

The n outputs of the three lookup tables 270–290 are respectively input to digital to analog converters (DAC's) 300, 310, and 320.

The outputs of the three digital to analog converters 300–320 are the outputs $V_1$, $V_2$, and $V_3$, respectively.

These three respective outputs are used to control the fractional wave elements 171–173 in the case of polarizer controller 174 and to control the fractional wave elements 121–123 in the case of polarizer 124.

Figure 3:
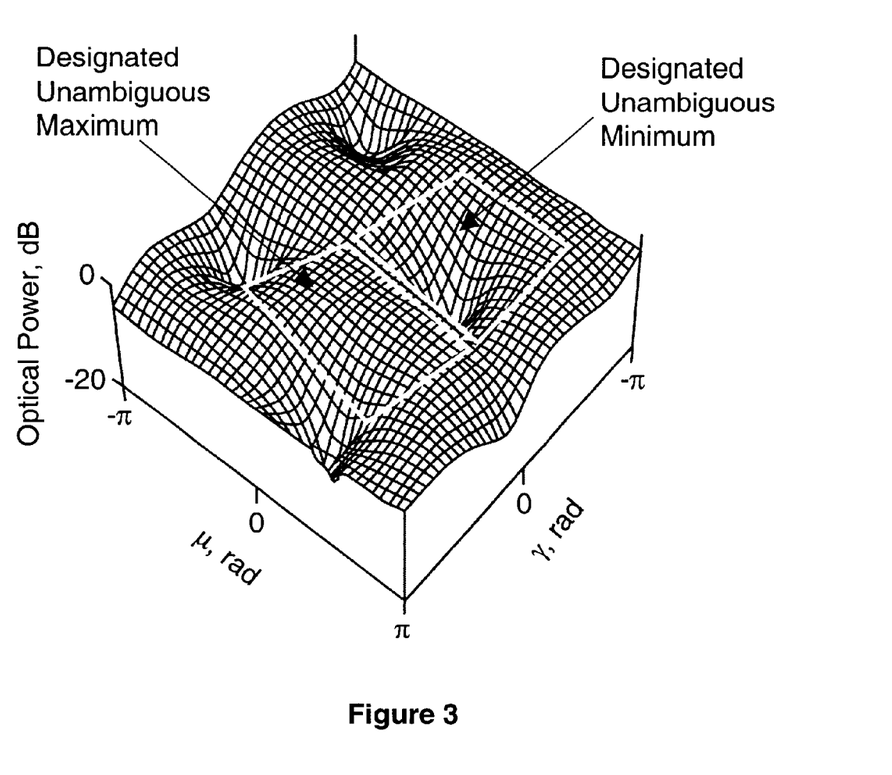
FIG. 3 illustrates the optical power over a state of the polarization domain.

The three lookup tables, which may be PROMs (programmable read only memories) store a set of three equations that are a function of a two dimensional function of $\mu$ and $\gamma$ and if one traverses this topography as shown in FIG. 3, it will be noted that the axes are also $\mu$ and $\gamma$ and the net output of the three outputs of the optical polarizer controllers $V_1$, $V_2$, and $V_3$ will create a power in the photodetector that has a value of that topography and what is occurring in the optical polarization controller is hypothetically searching, (performing what is commonly called a gradient search), over that topography and seeking the maximum or seeking the minimum as one steps up, steps down, steps to the left, and steps to the right, one steps through the four different possibilities of $\mu$ and $\gamma$ and determines which one of those directions is going in the correct direction on the topography and whichever it is, that is, if one is seeking the maximum whichever is the greater of these four directions and when one goes in the correct direction if one is seeking a minimum, whichever is the lower of these four directions and you repeat this process over and over until one actually achieves the desired maximum or minimum.

As noted previously, the polarization controller 174 may optionally include another phase adjuster 173A, disposed serially in the optical path with the elements 171–173. The reason for this additional phase adjuster is to compensate for phase changes in the optical paths due to changes in ambient conditions. That is, a small change in temperature may result in a small change in an optical path which, due to the small size of the optical waves, may result in a very significant change in phase of an optical signal.

Accordingly, the fourth polarization tracking voltage $V_4$ is generated in the polarization controller 174 to provide phase error compensation for elements 171–173. The fourth voltage $V_4$ drives the phase adjuster 173 with a phase correction generated by accumulating phase error in the phase accumulator 241 as illustrated in FIG. 2. The accumulator 241 integrates the phase error value by inputs from the adder 261 which compares the current value of the output of the A/D converter 210 with a tau dithered control signal provided by the successive approximation register 230. The tau dither which hypothesizes two phase offsets then drives the error value through the output of the adder 261 in the preferred direction. The accumulator 241 integrates this error and another digital to analog converter 321 transforms the data into a voltage $V_4$ which is output to the phase adjuster 173 to complete the phase tracking control loop.

Since, over a long period of time, the value stored in the accumulator 241 may increase beyond its range, the accumulator 241 may be periodically reset or an integral multiple of two B subtracted therefrom in order to keep the value stored in the accumulator 241 within its allowable range.

A similar polarization controller is discussed in detail in the article entitled "Integrated-Optic Polarization Controller With Unlimited Transformation Range", by F. Heisman, M. D. Divion, and L. L. Buhl, *Applied Physics Letters* 57(9) Aug. 27 1990, pages 855–857.

The three equations referred to above are the equations noted on page 885 of the above noted article and the values of these equations are stored in lookup tables 1–3, that is, elements 270, 280, and 290 of FIG. 2.

Although various preferred embodiments of the present invention have been described in detail herein, it will be appreciated by those skilled in the art that variations may be made thereto without the departing from the spirit of the invention or the scope of the appended claims.

What is claimed is:

1. A complex optical polarization locked loop apparatus comprising:

a laser source having an optical output;

N polarization controllers, each controller being optically coupled to said laser source optical output, N being a positive integer;

a first optical coupler coupled to said laser source optical output;

a reference polarization controller connected to an optical output of said first output coupler;

a second optical coupler coupled to an optical output of said reference polarization controller;

a linear polarizer coupled to an optical output of said second optical coupler;

a first photodetector having an electrical output connected to an electrical input of said reference polarization controller and having an optical input coupled to an optical output of said linear polarizer, said first photodetector converting an optical input into an electrical output;

N optical amplifiers, each amplifier having an optical input coupled to a respective optical output of one of said N polarization controllers;

N beam splitters, each beam splitter having one input being coupled to a respective optical output of one of said N optical amplifiers, each beam splitter outputting a substantial portion of an optical output of its respective optical amplifier;

N polarization maintaining fibers, each fiber having an input optically coupled to said reference polarization controller optical output and having an output optically coupled to another input of a respective one of said N beam splitters; and N second photodetectors, each second photodetector having an electrical output connected to an input of a respective one of said N polarization controllers and having an optical input coupled to an output a respective one of said N beam splitters, for converting an optical input into an electrical output;

wherein each of N loops consisting of: one of N polarization controllers and one of N optical amplifiers and one of N beam splitters and one of N second photodetectors is polarization locked with a reference loop consisting of: said first optical coupler, said reference polarization controller, said second optical coupler and said linear polarizer and said first photodetector, the polarization locking being due to said output from each of said polarization maintaining fibers interfering with each respective one of said N outputs of said N optical amplifiers in said respective one of said N beam splitters.

2. A method of polarization locking N optical loops to a reference optical loop, N being a positive integer and each of said N optical loops including a polarization controller connected to an optical amplifier, and the reference optical loop including a reference polarization controller and a linear optical polarizer, the method comprising the steps of:

providing an optical output from a laser source to all of the polarizer controllers;

feeding back a portion of an optical output of the reference polarization controller to an input of the reference polarization controller via the linear polarizer; and feeding a portion of the optical output of the reference polarization controller to an optical input of each of N beam splitters and feeding an optical output of each amplifier of the N loops to an optical input of a respective one of the N beam splitters, a substantial portion of the optical output of each amplifier being output by its respective beam splitter, wherein an interference optical output of the two optical inputs fed to each of the N beam splitters is fed back to an input of a respective one of the polarization controllers of the N loops such that the N optical loops are polarization locked with the reference optical loop.

3. The method of claim 2, further comprising the step of converting the optical output of the linear polarizer into an electrical output prior to feeding it back to the reference polarization controller.

4. The method of claim 2, further comprising the step of converting the optical output of each of the N beam splitters into respective electrical outputs prior to feeding them back to the respective ones of the polarization controllers of the N loops.

5. The method of claim 3, further comprising the step of converting the optical output of each of the N beam splitters into respective electrical outputs prior to feeding them back to the respective ones of the polarization controllers of the N loops.

6. The method of claim 2, further comprising the step of transmitting the optical output of the reference polarization controller to each of the N beam splitters via N polarization maintaining fibers.

7. The method of claim 3, further comprising the step of transmitting the optical output of the reference polarization controller to each of the N beam splitters via N polarization maintaining fibers.

8. The method of claim 4, further comprising the step of transmitting the optical output of the reference polarization controller to each of the N beam splitters via N polarization maintaining fibers.

9. The method of claim 5, further comprising the step of transmitting the optical output of the reference polarization controller to each of the N beam splitters via N polarization maintaining fibers.

10. The method of claim 2, further comprising the step of globally phase modulating optical outputs of each of the N optical amplifiers by applying a global modulating signal to the reference polarization controller.

11. The method of claim 2, further comprising the step of locally modulating the optical output of at least one of the N optical amplifiers by applying a local modulating signal to a respective one of the N polarization controllers of the at least one of the N optical amplifiers.

12. The method of claim 10, further comprising the step of locally modulating the optical output of at least one of the N optical amplifiers by applying a local modulating signal to a respective one of the N polarization controllers of the at least one of the N optical amplifiers.

13. An optical polarization locked loop apparatus comprising:
 a laser source having an optical output;
 N polarization controllers respectively optically connected to N optical amplifiers, N being an integer, each of the N polarization controllers having an optical input connected to said optical output of said laser source;
 a reference polarization controller having an optical input connected to said optical output of said laser source and having an optical output fed back to an input thereof via a linear polarizer; and
 N beam splitters, each beam splitter having two optical inputs, one of said inputs being connected to an optical output of a respective one of said N optical amplifiers and another of said inputs being connected to said optical output of said reference polarization controller, and having an output being fed back to an input of a respective one of said N polarization controllers, each beam splitter outputting a substantial portion of an optional output of its respective amplifier;
 wherein each of said N optical amplifier outputs is polarization locked to said optical output of said reference polarization controller due to said output from each of said N optical amplifiers interfering with said optical output of said reference polarization controller in said one of said respective N beam splitters.

14. The apparatus of claim 13, further comprising a photodetector disposed between said linear polarizer and said reference polarizer controller for converting an optical output of said linear polarizer into an electrical output prior to feeding it back to said reference polarizer controller.

15. The apparatus of claim 13, further comprising N photodetectors, each photodetector being disposed between an output of one of said N beam splitters and its respective one of N polarization controllers, for converting said optical output of each of said N beam splitters into an electrical output prior to feeding it back to said respective one of said N polarization controllers.

16. The apparatus of claim 14, further comprising N photodetectors, each photodetector being disposed between an output of one of said N beam splitters and its respective one of N polarization controllers, for converting said optical output of each of said N beam splitters into an electrical output prior to feeding it back to said respective one of said N polarization controllers.

17. The apparatus of claim 13, further comprising N polarization maintaining fibers, each fiber being disposed between said optical output of said reference polarization controller and said another input of one of said N beam splitters, for transmitting the optical output of said reference polarization controller to each of said N beam splitters.

18. The apparatus of claim 14, further comprising N polarization maintaining fibers, each fiber being disposed between said optical output of said reference polarization controller and said another input of one of said N beam splitters, for transmitting the optical output of said reference polarization controller to each of said N beam splitters.

19. The apparatus of claim 15, further comprising N polarization maintaining fibers, each fiber being disposed between said optical output of said reference polarization controller and said another input of one of said N beam splitters, for transmitting the optical output of said reference polarization controller to each of said N beam splitters.

20. The apparatus of claim 16, further comprising N polarization maintaining fibers, each fiber being disposed between said optical output of said reference polarization controller and said another input of one of said N beam splitters, for transmitting the optical output of said reference polarization controller to each of said N beam splitters.

21. The apparatus of claim 13, said reference polarization controller comprising a modulator for globally phase modulating optical outputs of each of said N optical amplifiers by modulating said optical output of said reference polarization controller.

22. The apparatus of claim 13, at least one of said N polarization controllers comprising a modulator for locally modulating said output of its respective optical amplifier.

23. The apparatus of claim 21, at least one of said N polarization controllers comprising a modulator for locally modulating said output of its respective optical amplifier.

24. The apparatus of claim 1, each of said polarization controllers comprising:
 a first quarter wave controllable optical element, a first controllable half wave optical element, and a second controllable quarter wave optical element, said three optical elements being arranged serially in an optical path; and
 a polarizer controller connected to said three optical elements for controlling said optical elements to produce a specified phase retardation.

25. The method of claim 2, each polarization controller performing the following steps:
 passing an optical input through a first quarter wave controllable optical element, a first half wave controllable optical element, and a second quarter wave controllable optical element, the three optical elements being arranged serially along an optical path; and
 controlling the three optical elements with a polarizer controller so as to produce a specified phase retardation in the three optical elements.

26. The apparatus of claim 13, each of said polarization controllers comprising:
 a first quarter wave controllable optical element, a first controllable half wave optical element, and a second controllable quarter wave optical element, said three optical elements being arranged serially in an optical path; and
 a polarizer controller connected to said three optical elements for controlling said optical elements to produce a specified phase retardation.

27. The apparatus of claim 24, said polarizer controller comprising:
 an analog to digital converter for receiving an analog input and outputting a digital output;
 a successive approximation register connected to said digital output of said analog to digital converter;
 a $\mu$ accumulator connected to an output of said successive approximation register;
 a $\gamma$ accumulator connected to an output of said successive approximation register;

a first lookup table having inputs connected to outputs of said μ and γ accumulators;

a second lookup table having inputs connected to said outputs of said μ and γ accumulators;

a third lookup table having inputs connected to said outputs of said μ and γ accumulators; and first, second and third digital to analog converters respectively connected to outputs of said first, second and third lookup tables for respectively converting digital outputs thereof into analog outputs;

wherein said analog outputs of said first, second, and third digital to analog converters are respectively connected to said first quarter wave optical element, first half wave optical element, and second quarter wave optical element for controlling said optical elements in response to respective outputs of said digital to analog converters.

28. The apparatus of claim 26, said polarizer controller comprising:

an analog to digital converter for receiving an analog input and outputting a digital output;

a successive approximation register connected to said digital output of said analog to digital converter;

a μ accumulator connected to an output of said successive approximation register;

a γ accumulator connected to an output of said successive approximation register;

a first lookup table having inputs connected to outputs of said μ and γ accumulators;

a second lookup table having inputs connected to said outputs of said μ and γ accumulators;

a third lookup table having inputs connected to said outputs of said μ and γ accumulators; and first, second and third digital to analog converters respectively connected to outputs of said first, second and third lookup tables for respectively converting digital outputs thereof into analog outputs;

wherein said analog outputs of said first, second, and third digital to analog converters are respectively connected to said first quarter wave optical element, first half wave optical element, and second quarter wave optical element for controlling said optical elements in response to respective outputs of said digital to analog converters.

29. The apparatus of claim 21, each of said polarization controllers comprising:

a first quarter wave controllable optical element, a first controllable half wave optical element, and a second controllable quarter wave optical element, said three optical elements being arranged serially in an optical path; and a polarizer controller connected to said three optical elements for controlling said optical elements to produce a specified phase retardation.

30. The apparatus of claim 22, each of said polarization controllers comprising:

a first quarter wave controllable optical element, a first controllable half wave optical element, and a second controllable quarter wave optical element, said three optical elements being arranged serially in an optical path; and a polarizer controller connected to said three optical elements for controlling said optical elements to produce a specified phase retardation.

31. The apparatus of claim 29, said polarizer controller comprising:

an analog to digital converter for receiving an analog input and outputting a digital output;

a successive approximation register connected to said digital output of said analog to digital converter;

a μ accumulator connected to an output of said successive approximation register;

a γ accumulator connected to an output of said successive approximation register;

a first lookup table having inputs connected to outputs of said μ and γ accumulators;

a second lookup table having inputs connected to said outputs of said μ and γ accumulators;

a third lookup table having inputs connected to said outputs of said μ and γ accumulators; and first, second and third digital to analog converters respectively connected to outputs of said first, second and third lookup tables for respectively converting digital outputs thereof into analog outputs;

wherein said analog outputs of said first, second, and third digital to analog converters are respectively connected to said first quarter wave optical element, first half wave optical element, and second quarter wave optical element for controlling said optical elements in response to respective outputs of said digital to analog converters.

32. The apparatus of claim 30, said polarizer controller comprising:

an analog to digital converter for receiving an analog input and outputting a digital output;

a successive approximation register connected to said digital output of said analog to digital converter;

a μ accumulator connected to an output of said successive approximation register;

a γ accumulator connected to an output of said successive approximation register;

a first lookup table having inputs connected to outputs of said μ and γ accumulators;

a second lookup table having inputs connected to said outputs of said μ and γ accumulators;

a third lookup table having inputs connected to said outputs of said μ and γ accumulators; and first, second and third digital to analog converters respectively connected to outputs of said first, second and third lookup tables for respectively converting digital outputs thereof into analog outputs;

wherein outputs of said first, second, and third digital to analog converters are respectively connected to said first quarter wave optical element, first half wave optical element, and second quarter wave optical element for controlling said optical elements in response to respective outputs of said digital to analog converters.

33. The apparatus of claim 31, said modulator comprising first and second summers respectively disposed between said μ accumulator and said first, second, and third lookup tables and said γ accumulator and said first, second, and third lookup tables, said first and second summers respectively receiving modulation inputs.

34. The apparatus of claim 32, said modulator comprising first and second summers respectively disposed between said μ accumulator and said first, second, and third lookup tables and said γ accumulator and said first, second, and third lookup tables, said first and second summers respectively receiving modulation inputs.

35. The apparatus of claim 1, each of said polarization controllers comprising:
   a first quarter wave controllable optical element, a first controllable half wave optical element, a second controllable quarter wave optical element and an optical phase adjuster element, said four optical elements being arranged serially in an optical path; and
   a polarizer controller connected to said four optical elements for controlling said optical elements to produce a specified phase retardation and a phase adjustment.

36. The method of claim 2, each polarization controller performing the following steps:
   passing an optical input through a first quarter wave controllable optical element, a first half wave controllable optical element, a second quarter wave controllable optical element and an optical phase adjuster element, the four optical elements being arranged serially along an optical path; and
   controlling the four optical elements with a polarizer controller so as to produce a specified phase retardation in the three optical elements and a phase adjustment in the optical phase adjuster element.

37. The apparatus of claim 13, each of said polarization controllers comprising:
   a first quarter wave controllable optical element, a first controllable half wave optical element, a second controllable quarter wave optical element and an optical phase adjuster element, said four optical elements being arranged serially in an optical path; and
   a polarizer controller connected to said four optical elements for controlling said optical elements to produce a specified phase retardation and a phase adjustment.

38. The apparatus of claim 24, said polarizer controller comprising:
   an analog to digital converter for receiving an analog input and outputting a digital output;
   a successive approximation register connected to said digital output of said analog to digital converter;
   a $\mu$ accumulator connected to an output of said successive approximation register;
   a $\gamma$ accumulator connected to an output of said successive approximation register;
   a first lookup table having inputs connected to outputs of said $\mu$ and $\gamma$ accumulators;
   a second lookup table having inputs connected to said outputs of said $\mu$ and $\gamma$ accumulators;
   a third lookup table having inputs connected to said outputs of said $\mu$ and $\gamma$ accumulators;
   an adder connected to outputs of said analog to digital converter and said successive approximation register;
   a phase accumulator connected to an output of said adder; and
   a fourth digital to analog convert connected to an output of said phase accumulator for converting a digital output thereof into an analog output;
   first, second and third digital to analog converters respectively connected to outputs of said first, second and third lookup tables for respectively converting digital outputs thereof into analog outputs;
   wherein said analog outputs of said first, second, and third digital to analog converters are respectively connected to said first quarter wave optical element, first half wave optical element, and second quarter wave optical element for controlling said optical elements in response to respective outputs of said digital to analog converters;
   and wherein said analog output of said fourth digital to analog converter is connected to said optical phase adjuster element for controlling said optical phase adjuster element in response thereto.

39. The method of claim 36, further comprising accumulating a phase error in a phase error accumulator in the polarizer controller and converting an output thereof into a signal for controlling the optical phase adjuster element to adjust the phase of the optical output of the amplifier.

40. The apparatus of claim 37, said polarizer controller comprising:
   an analog to digital converter for receiving an analog input and outputting a digital output;
   a successive approximation register connected to said digital output of said analog to digital converter;
   a $\mu$ accumulator connected to an output of said successive approximation register;
   a $\gamma$ accumulator connected to an output of said successive approximation register;
   a first lookup table having inputs connected to outputs of said $\mu$ and $\gamma$ accumulators;
   a second lookup table having inputs connected to said outputs of said $\mu$ and $\gamma$ accumulators;
   a third lookup table having inputs connected to said outputs of said $\mu$ and $\gamma$ accumulators;
   an adder connected to outputs of said analog to digital converter and said successive approximation register;
   a phase accumulator connected to an output of said adder; and
   a fourth digital to analog convert connected to an output of said phase accumulator for converting a digital output thereof into an analog output;
   first, second and third digital to analog converters respectively connected to outputs of said first, second and third lookup tables for respectively converting digital outputs thereof into analog outputs;
   wherein said analog outputs of said first, second, and third digital to analog converters are respectively connected to said first quarter wave optical element, first half wave optical element, and second quarter wave optical element for controlling said optical elements in response to respective outputs of said digital to analog converters;
   and wherein said analog output of said fourth digital to analog converter is connected to said optical phase adjuster element for controlling said optical phase adjuster element in response thereto.

41. The apparatus of claim 21, each of said polarization controllers comprising:
   a first quarter wave controllable optical element, a first controllable half wave optical element, a second controllable quarter wave optical element and an optical phase adjuster element, said four optical elements being arranged serially in an optical path; and
   a polarizer controller connected to said four optical elements for controlling said optical elements to produce a specified phase retardation and a phase adjustment.

42. The apparatus of claim 22, each of said polarization controllers comprising:
   a first quarter wave controllable optical element, a first controllable half wave optical element, a second controllable quarter wave optical element and an optical phase adjuster element, said four optical elements being arranged serially in an optical path; and a polarizer controller connected to said four optical elements for controlling said optical elements to produce a specified phase retardation and a phase adjustment.

43. The apparatus of claim 41, said polarizer controller comprising:

an analog to digital converter for receiving an analog input and outputting a digital output;

a successive approximation register connected to said digital output of said analog to digital converter;

a $\mu$ accumulator connected to an output of said successive approximation register;

a $\gamma$ accumulator connected to an output of said successive approximation register;

a first lookup table having inputs connected to outputs of said $\mu$ and $\gamma$ accumulators;

a second lookup table having inputs connected to said outputs of said $\mu$ and $\gamma$ accumulators;

a third lookup table having inputs connected to said outputs of said $\mu$ and $\gamma$ accumulators;

an adder connected to outputs of said analog to digital converter and said successive approximation register;

a phase accumulator connected to an output of said adder; and a fourth digital to analog convert connected to an output of said phase accumulator for converting a digital output thereof into an analog output;

first, second and third digital to analog converters respectively connected to outputs of said first, second and third lookup tables for respectively converting digital outputs thereof into analog outputs;

wherein said analog outputs of said first, second, and third digital to analog converters are respectively connected to said first quarter wave optical element, first half wave optical element, and second quarter wave optical element for controlling said optical elements in response to respective outputs of said digital to analog converters;

and wherein said analog output of said fourth digital to analog converter is connected to said optical phase adjuster element for controlling said optical phase adjuster element in response thereto.

44. The apparatus of claim 42, said polarizer controller comprising:

an analog to digital converter for receiving an analog input and outputting a digital output;

a successive approximation register connected to said digital output of said analog to digital converter;

a $\mu$ accumulator connected to an output of said successive approximation register;

a $\gamma$ accumulator connected to an output of said successive approximation register;

a first lookup table having inputs connected to outputs of said $\mu$ and $\gamma$ accumulators;

a second lookup table having inputs connected to said outputs of said $\mu$ and $\gamma$ accumulators;

a third lookup table having inputs connected to said outputs of said $\mu$ and $\gamma$ accumulators;

an adder connected to outputs of said analog to digital converter and said successive approximation register;

a phase accumulator connected to an output of said adder; and a fourth digital to analog convert connected to an output of said phase accumulator for converting a digital output thereof into an analog output;

first, second and third digital to analog converters respectively connected to outputs of said first, second and third lookup tables for respectively converting digital outputs thereof into analog outputs;

wherein said analog outputs of said first, second, and third digital to analog converters are respectively connected to said first quarter wave optical element, first half wave optical element, and second quarter wave optical element for controlling said optical elements in response to respective outputs of said digital to analog converters;

and wherein said analog output of said fourth digital to analog converter is connected to said optical phase adjuster element for controlling said optical phase adjuster element in response thereto.

45. The apparatus of claim 43, said modulator comprising first and second summers respectively disposed between said $\mu$ accumulator and said first, second, and third lookup tables and said $\gamma$ accumulator and said first, second, and third lookup tables, said first and second summers respectively receiving modulation inputs.

46. The apparatus of claim 44, said modulator comprising first and second summers respectively disposed between said $\mu$ accumulator and said first, second, and third lookup tables and said $\gamma$ accumulator and said first, second, and third lookup tables, said first and second summers respectively receiving modulation inputs.

* * * * *